3,766,265
PROCESS FOR THE PREPARATION OF ACRYLIC ACID

Tatsuo Shiraishi, Susumu Kishiwada, Shinkichi Shimizu, Shigeru Honmaru, Yoshihiko Nagaoka, and Kiyokazu Zinpo, Niihama, Japan, assignors to Sumitomo Chemical Company, Limited, Osaka-fu, Japan
No Drawing. Filed Mar. 24, 1972, Ser. No. 237,938
Claims priority, application Japan, Mar. 26, 1971, 46/18,055
Int. Cl. C07c 51/26, 57/04
U.S. Cl. 260—530 N    10 Claims

ABSTRACT OF THE DISCLOSURE

In the preparation of acrylic acid by the gas phase catalytic oxidation of acrolein with molecular oxygen in the presence of steam, a process wherein the oxidation is effected in the presence of a catalyst composition corresponding to the formula: $Mo_aV_b(Li_2SO_4)_cO_d$ wherein $a$, $b$ and $d$ represent respectively the number of atoms and $c$ is the mol number of lithium sulfate, and wherein $a$ is 12, $b$ is 0.1 to 9.0, $c$ is 0.1 to 9.0 and $d$ is 36.25 to 58.5. The catalyst composition has a high catalytic activity with a long catalytic life, and acrylic acid is produced in an excellent yield with a high purity by the use of such composition.

---

The present invention relates to a process for the preparation of acrylic acid. More particularly, it relates to a process for the preparation of acrylic acid by the gas phase catalytic oxidation of acrolein in the presence of a specific catalyst composition.

For the gas phase catalytic oxidation of acrolein to produce acrylic acid, there have been known various catalyst compositions: e.g. a catalyst composition comprising molybdenum oxide and vanadium oxide deposited on silica gel [Japanese patent publication No. 1,775/1966], a catalyst composition comprising oxides of molybdenum, vanadium and arsenic deposited on silica [Japanese patent publication No. 16,604/1967], a catalyst composition comprising molybdenum oxide and vanadium oxide deposited on aluminum sponge [Japanese patent publication No. 11,647/1969], a catalyst composition comprising oxides of molybdenum, vanadium and aluminum with an additional other metal oxide [Japanese patent publication No. 26,287/1969], etc. These catalyst compositions have a relatively high catalytic activity. But, the catalytic activity is considerably varied with the preparation method, and it is difficult to obtain a catalyst composition having a stable and constant catalytic activity. Moreover, their catalytic life is relatively short.

As the result of the extensive study seeking a catalyst composition for the gas phase catalytic oxidation of acrolein to acrylic acid overcoming the drawbacks as seen in conventional catalyst compositions, it has now been found that the incorporation of lithium sulfate into a catalyst system comprising molybdenum oxide and vanadium oxide affords a catalyst composition which has a much longer catalytic life with a higher catalytic activity than any conventional one. Advantageously, the catalytic activity of such catalyst composition is stable and constant without any considerable variation depending on the preparation method. It is also advantageous that such catalyst composition gives a good conversion of acrolein and a favorable selectivity to acrylic acid so that acrylic acid can be produced at an excellent yield in a high purity.

For instance, the gas phase oxidation of acrolein using such catalyst composition at 300° C. with a space velocity of 1,000 litre·gas/litre·catalyst/hr. gives the following results:

After 4 hours: conversion of acrolein, 99.8%; selectivity to total-acids (this term indicating all kinds of acids produced and by-produced by the catalytic oxidation of acrolein), 94.7%; selectivity of acrylic acid, 92.6%; per pass yield of acrylic acid, 92.4%; acrylic acid content in total-acids, 98.2% by weight.

After 1200 hours: conversion of acrolein, 97.6%; selectivity to acrylic acid, 92.1%; per pass yield of acrylic acid, 89.9%.

According to the present invention, there is provided a process for the preparation of acrylic acid by the gas phase catalytic oxidation of acrolein with molecular oxygen in the presence of steam at an elevated temperature using a catalyst composition corresponding to the formula: $Mo_aV_b(Li_2SO_4)_cO_d$ wherein $a$, $b$ and $d$ represent respectively the number of atoms and $c$ is the mol number of lithium sulfate, provided that, in case of $a$ being 12, $b$ is 0.1 to 9.0, $c$ is 0.1 to 9.0 and $d$ is 36.25 to 58.5.

For preparation of the catalyst composition, there are employed a molybdenum source (e.g. ammonium molybdate, molybdenum oxide, molybdic acid), a vanadium source (e.g. ammonium metavanadate, vanadium pentoxide) and a lithium sulfate source. As the lithium sulfate source, there may be used lithium sulfate itself or the combination of any lithium salt (e.g. lithium nitrate, lithium carbonate) with sulfuric acid.

The catalyst composition may be composed of the said essential sources only but favorably further with a suitable carrier (e.g. silica sol, silica gel, alumina, aluminum sponge, silicon carbide, diatomaceous earth, titanium oxide). Silica sol is a particularly preferred carrier. The amount of the carrier is varied with its kind and may be usually less than 90% by weight, preferably from 5 to 90% by weight, of the catalyst composition.

The preparation of the catalyst composition may be executed by a per se conventional procedure: e.g. ammonium metavanadate is dissolved in an aqueous solution of oxalic acid for reduction, aqueous solutions of ammonium molybdate and of lithium sulfate are added thereto, and the resulting mixture is admixed with a carrier (e.g. silica sol); the resultant slurry is evaporated at 100 to 150° C. to dryness, heated to 250° C. in 2 hours and then calcined at 250° C. for 3 hours; the resultant cake is crushed, admixed with graphite, pelletized and calcined in the atmosphere at 350° C. for 6 hours.

The production of acrylic acid using the catalyst composition of the invention may be effected by a fluidized bed process or a fixed bed process. The particle size of the catalyst composition is not particularly limited and may be optionally varied with the type of its use.

The gaseous mixture to be contacted with the catalyst composition may contain 0.5 to 4 mol (preferably about 0.8 to 2.5 mol) of oxygen and 1 to 20 mol (preferably about 5 to 15 mol) of steam per 1 mol of acrolein. The space velocity of the gaseous mixture is usually from 360 to 4,000 litre·gas/litre·catalyst/hr., preferably from 450 to 1,800 litre·gas/litre·catalyst/hr.

As the oxygen source, there may be used pure oxygen gas, air enhanced or not in oxygen concentration or any other molecular oxygen-containing gas. From the economical viewpoint, the use of air is preferred. As the case may be, steam is introduced into the reaction system. If desired, an appropriate inert gas such as nitrogen, carbon dioxide or argon may be used as a diluent.

The reaction temperature for the oxidation of acrolein is associated with the kind of the catalyst composition and may be usually from 250 to 400° C., favorably from 270 to 350° C. The reaction pressure may be around atmospheric pressure, preferably from 0.7 to 5 absolute atm.

As illustrated above, the catalyst composition of the invention is characteristic in showing a high catalytic activity and a long catalytic life in the oxidation of acrolein to acrylic acid. Thus, the process of this invention can afford acrylic acid in an excellent yield with a high purity.

Practical and presently preferred embodiments of the present invention are illustratively shown in the following examples wherein:

Reacted acrolein (mol)

= Feed acrolein (mol) − Unreacted acrolein (mol)

Conversion of acrolein (%)

$$=\frac{\text{Reacted acrolein (mol)}}{\text{Feed acrolein (mol)}} \times 100$$

Selectivity to total-acids (%)

$$=\frac{\text{Total-acids (in terms of acrylic acid) (mol)}}{\text{Reacted acrolein (mol)}} \times 100$$

Selectivity to acrylic acid (%)

$$=\frac{\text{Produced acrylic acid (mol)}}{\text{Reacted acrolein (mol)}} \times 100$$

Yield of acrylic acid (%)

$$=\frac{\text{Produced acrylic acid (mol)}}{\text{Feed acrolein (mol)}} \times 100$$

(All the measurements were made by gas chromatography and alkali titration.)

EXAMPLE 1

Into a solution of 28% (weight by weight) ammonia water (360 parts by weight) in water (500 parts by weight), ammonium molybdate ($(NH_4)_6Mo_7O_{24} \cdot 4H_2O$) (425 parts by weight) was dissolved. Separately, oxalic acid (116 parts by weight) was dissolved in water (300 parts by weight) while heating, and then ammonium metavanadate ($NH_4VO_3$) (47 parts by weight) was dissolved therein under heating. The ammonium metavanadate was reduced with oxalic acid and carbon dioxide was generated. After the generation of carbon dioxide ceased, there was obtained a dark blue aqueous solution of vanadyl oxalate, which was added to the above prepared aqueous molybdate solution. A solution of lithium sulfate ($LiSO_4 \cdot H_2O$) (50.5 parts by weight) in water (400 parts by weight) was incorporated therein. Then, silica sol containing 20% (by weight) $SiO_2$ (900 parts by weight) was added thereto. The resultant mixture was evaporated at 100 to 150° C. to dryness. The dried material was charged in an electric furnace, and the temperature was elevated to 250° C. in 2 hours. Calcination was carried out at the same temperature for 3 hours. The calcined material was crushed, about 2% by weight of graphite was admixed therewith and the resultant mixture was pelletized. The pellets were calcined at 350° C. for 6 hours, crushed and passed through a sieve to give a catalyst composition corresponding to the formula: $Mo_{12}V_2(Li_2SO_4)_2O_{40-41}$ of 10 to 16 mesh.

The above prepared catalyst composition (25 ml.) was charged in a glass made reactor of 15 mm. in inner diameter. A gaseous mixture of 5.0 mol percent of acrolein, 7.5 mol percent of oxygen, 57.5 mol percent of nitrogen and 30.0 mol percent of steam was fed into the reactor at a space velocity of 1,000 litre·gas/litre·catalyst/hr. and contacted with the catalyst composition at 300° C.

The obtained results were as follows: conversion of acrolein, 99.8%; selectivity to total-acids, 94.7%; selectivity to acrylic acid, 92.6%; per pass yield of acrylic acid, 92.4%; purity of acrylic acid in total-acids, 98.2% by weight.

EXAMPLES 2 TO 23

As in Example 1 but varying the proportion of ammonium metavanadate ($NH_4VO_3$), ammonium molybdate ($(NH_4)_6Mo_7O_{24} \cdot 4H_2O$) and lithium sulfate ($LiSO_4 \cdot H_2O$)

there were prepared a number of catalyst compositions. The reactions were carried out using these catalyst compositions under the same reaction conditions as in Example 1 but varying the reaction temperature.

The results are as shown in Table 1.

TABLE 1

| Example No. | Catalyst composition | | | Reaction temperature (° C.) | Conversion of acrolein (percent) | Selectivity to total-acids (percent) | Selectivity to acrylic acid (percent) | Yield of acrylic acid (percent) |
|---|---|---|---|---|---|---|---|---|
| | Number of atoms | | Mol number $Li_2SO_4$ | | | | | |
| | Mo | V | | | | | | |
| 2 | 12 | 0.5 | 0.5 | 325 | 97.7 | 89.1 | 87.5 | 85.1 |
| 3 | 12 | 0.5 | 1.0 | 320 | 98.4 | 87.8 | 86.3 | 84.9 |
| 4 | 12 | 0.5 | 4.0 | 325 | 100 | 90.3 | 88.6 | 88.6 |
| 5 | 12 | 1.0 | 1.0 | 312 | 98.4 | 90.7 | 89.8 | 88.4 |
| 6 | 12 | 1.0 | 2.0 | 315 | 98.7 | 93.3 | 92.1 | 90.9 |
| 7 | 12 | 1.0 | 4.0 | 318 | 99.2 | 92.7 | 90.1 | 89.4 |
| 8 | 12 | 1.0 | 6.0 | 310 | 100 | 92.3 | 90.7 | 90.7 |
| 9 | 12 | 2.0 | 0.5 | 318 | 100 | 91.9 | 90.2 | 90.2 |
| 10 | 12 | 2.0 | 4.0 | 316 | 100 | 93.8 | 91.7 | 91.7 |
| 11 | 12 | 2.0 | 6.0 | 330 | 98.8 | 91.7 | 90.7 | 89.6 |
| 12 | 12 | 2.0 | 9.0 | 338 | 94.1 | 91.8 | 91.4 | 86.0 |
| 13 | 12 | 4.0 | 1.0 | 320 | 100 | 91.8 | 89.4 | 89.4 |
| 14 | 12 | 4.0 | 2.0 | 320 | 98.3 | 92.5 | 90.7 | 89.2 |
| 15 | 12 | 4.0 | 4.0 | 328 | 95.5 | 91.6 | 91.2 | 87.1 |
| 16 | 12 | 4.0 | 9.0 | 332 | 100 | 90.2 | 85.8 | 85.8 |
| 17 | 12 | 6.0 | 1.0 | 320 | 98.0 | 91.2 | 90.6 | 88.8 |
| 18 | 12 | 6.0 | 2.0 | 305 | 100 | 90.0 | 89.0 | 89.0 |
| 19 | 12 | 6.0 | 4.0 | 305 | 100 | 88.4 | 85.9 | 85.9 |
| 20 | 12 | 6.0 | 6.0 | 328 | 95.8 | 91.6 | 89.5 | 85.7 |
| 21 | 12 | 6.0 | 9.0 | 335 | 97.4 | 90.5 | 87.8 | 85.5 |
| 22 | 12 | 9.0 | 2.0 | 334 | 97.8 | 90.8 | 88.0 | 86.1 |
| 23 | 12 | 9.0 | 4.0 | 342 | 96.2 | 90.2 | 87.7 | 84.4 |

REFERENCE EXAMPLES 1 to 12

As in Example 1 but varying the proportion of ammonium metavanadate ($NH_4VO_3$), ammonium molybdate ($(NH_4)_6Mo_7O_{24} \cdot 4H_2O$) and lithium sulfate ($LiSO_4 \cdot H_2O$) and using or not using sulfuric acid or lithium nitrate in place of lithium sulfate, there were prepared a number of catalyst compositions. The reactions were carried out using these catalyst compositions under the same reaction conditions as in Example 1 but varying the reaction temperature.

The results are as shown in Table 2.

TABLE 2

| Reference Example No. | Catalyst composition | | | | | Reaction temperature (°C.) | Conversion of acrolein (percent) | Selectivity to total-acids (percent) | Selectivity to acrylic acid (percent) | Yield of acrylic acid (percent) |
|---|---|---|---|---|---|---|---|---|---|---|
| | Number of atoms | | Mol number | | | | | | | |
| | Mo | V | LiNO₃ | H₂SO₄ | Li₂SO₄ | | | | | |
| 1 | 12 | 2 | 0 | 0 | 12 | 350 | 96.6 | 84.5 | 83.9 | 81.0 |
| 2 | 12 | 12 | 0 | 0 | 2 | 385 | 93.5 | 74.2 | 64.7 | 60.5 |
| 3 | 12 | 12 | 0 | 0 | 9 | 337 | 79.4 | 59.6 | 57.7 | 45.8 |
| 4 | 12 | 1 | 0 | 0 | 0 | 312 | 95.3 | 87.1 | 85.0 | 80.9 |
| 5 | 12 | 2 | 0 | 0 | 0 | 305 | 97.8 | 84.5 | 83.4 | 81.6 |
| 6 | 12 | 4 | 0 | 0 | 0 | 320 | 95.6 | 84.9 | 84.5 | 80.8 |
| 7 | 12 | 6 | 0 | 0 | 0 | 333 | 94.8 | 80.4 | 78.2 | 74.1 |
| 8 | 12 | 9 | 0 | 0 | 0 | 347 | 95.1 | 76.6 | 72.3 | 68.8 |
| 9 | 12 | 2 | 2 | 0 | 0 | 325 | 96.3 | 85.1 | 83.7 | 80.6 |
| 10 | 12 | 2 | 4 | 0 | 0 | 338 | 81.0 | 82.5 | 79.6 | 64.5 |
| 11 | 12 | 2 | 0 | 2 | 0 | 320 | 96.5 | 88.3 | 86.5 | 83.5 |
| 12 | 12 | 2 | 0 | 4 | 0 | 350 | 84.3 | 83.3 | 78.2 | 65.9 |

EXAMPLE 24

Using the catalyst composition as in Example 1, the reaction was carried out continuously under the same reaction conditions as in Example 1.

The results are as shown in Table 3.

TABLE 3

| Reaction time (hr.) | Conversion of acrolein (percent) | Selectivity to acrylic acid (percent) | Yield of acrylic acid (percent) |
|---|---|---|---|
| 4 | 99.8 | 92.6 | 92.4 |
| 238 | 98.4 | 92.8 | 91.3 |
| 482 | 98.5 | 92.2 | 90.8 |
| 720 | 98.2 | 91.8 | 90.1 |
| 1,200 | 97.6 | 92.1 | 89.9 |

What is claimed is:

1. In the preparation of acrylic acid by the gas phase catalytic oxidation of acrolein with molecular oxygen in the presence of stream, a process wherein a gaseous mixture comprising acrolein, oxygen and steam is contacted at an elevated temperature with a catalyst consisting essentially of the composition corresponding to the formula: $Mo_aV_b(Li_2SO_4)_cO_d$ wherein $a$, $b$ and $d$ represent respectively the number of atoms and $c$ is the mol number of lithium sulfate and wherein $a$ is 12, $b$ is 0.1 to 9.0, $c$ is 0.1 to 9.0 and $d$ is 36.25 to 58.5.

2. The process according to claim 1, wherein the catalyst is supported on a carrier.

3. The process according to claim 2, wherein the carrier is silica sol.

4. The process according to claim 1, wherein the oxygen source is air.

5. The process according to claim 1, wherein the gaseous mixture comprises 0.5 to 4 mol of oxygen and 1 to 20 mol of steam per 1 mol of acrolein.

6. The process according to claim 5, wherein the gaseous mixture comprises 0.8 to 2.5 mol of oxygen and 5 to 15 mol of steam per 1 mol of acrolein.

7. The process according to claim 1, wherein the contact is effected at a temperature of from 250 to 400° C.

8. The process according to claim 7, wherein the contact is effected at a temperature of from 270 to 350° C.

9. The process according to claim 1, wherein the contact is effected at a space velocity of 360 to 400 litre-gas/litre-catalyst/hr.

10. The process according to claim 9, wherein the contact is effected at a space velocity of 450 to 1,800 litre-gas/litre-catalyst/hr.

References Cited

FOREIGN PATENTS 411,775   4/1973   Japan _____ 260—530 N

LORRAINE A. WEINBERGER, Primary Examiner

R. D. KELLY, Assistant Examiner

U.S. Cl. X.R.

252—440